US012326987B2

(12) United States Patent
Tian et al.

(10) Patent No.: US 12,326,987 B2
(45) Date of Patent: Jun. 10, 2025

(54) DEVICE OPERATING METHOD, SYSTEM, AND DEVICE

(71) Applicant: GOERTEK INC., Shandong (CN)

(72) Inventors: Li Tian, Shandong (CN); Shumin Tan, Shandong (CN); Zongxu Yang, Shandong (CN); Jingyang Liu, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/559,903

(22) PCT Filed: Dec. 13, 2021

(86) PCT No.: PCT/CN2021/137335
§ 371 (c)(1),
(2) Date: Nov. 9, 2023

(87) PCT Pub. No.: WO2023/273186
PCT Pub. Date: Jan. 5, 2023

(65) Prior Publication Data
US 2024/0385704 A1    Nov. 21, 2024

(30) Foreign Application Priority Data
Jun. 30, 2021   (CN) .......................... 202110741518.0

(51) Int. Cl.
*G06F 3/0362* (2013.01)
*G06F 1/16* (2006.01)

(52) U.S. Cl.
CPC ............ *G06F 3/0362* (2013.01); *G06F 1/163* (2013.01)

(58) Field of Classification Search
CPC ............................................. G06F 3/03–0395
See application file for complete search history.

(56) References Cited

U.S. PATENT DOCUMENTS 10,048,802 B2 *   8/2018   Shedletsky ............. G06F 1/163
10,222,909 B2 *   3/2019   Shedletsky ............. G06F 3/044
(Continued)

FOREIGN PATENT DOCUMENTS

CN      104767844 A       7/2015
CN      106687870 A       5/2017
(Continued)

OTHER PUBLICATIONS

International Search Report from International Application No. PCT/CN2021/137335 mailed Mar. 9, 2022.

*Primary Examiner* — Patrick F Marinelli
(74) *Attorney, Agent, or Firm* — Shih IP Law Group, PLLC

(57) ABSTRACT

Some embodiments of the present disclosure disclose a wrist-worn device, including a micro control unit, a distance sensor and a rotating shaft arranged on a side surface of the wrist-worn device, an outer circumferential surface of the rotating shaft is provided with a plurality of protrusions; wherein the distance sensor is configured to collect distance data and send the distance data to the micro control unit, and the distance data includes a distance between the distance sensor and the rotating shaft; and the micro control unit is configured to obtain distance changing information on a distance between the distance sensor and the rotating shaft during a preset time according to the distance data, and determine a rotation angle of the rotating shaft according to the distance changing information on the distance.

10 Claims, 5 Drawing Sheets

(56) References Cited

U.S. PATENT DOCUMENTS

| | | | |
|---|---|---|---|
| 10,613,685 B2* | 4/2020 | Shedletsky | G06F 1/163 |
| 10,884,549 B2* | 1/2021 | Shedletsky | G06F 1/163 |
| 11,347,351 B2* | 5/2022 | Shedletsky | G06F 3/044 |
| 11,669,205 B2* | 6/2023 | Shedletsky | G06F 3/044 345/174 |
| 12,045,416 B2* | 7/2024 | Shedletsky | G06F 3/0362 |
| 2016/0018948 A1 | 1/2016 | Parvarandeh et al. | |
| 2017/0010751 A1* | 1/2017 | Shedletsky | G06F 3/0418 |
| 2024/0192804 A1* | 6/2024 | Shedletsky | G06F 3/0418 |
| 2024/0216794 A1* | 7/2024 | Koda | A63F 13/24 |

FOREIGN PATENT DOCUMENTS

| | | |
|---|---|---|
| CN | 210691146 U | 6/2020 |
| CN | 111488076 A | 8/2020 |
| CN | 111637975 A | 9/2020 |
| CN | 111788549 A | 10/2020 |
| CN | 112965362 A | 6/2021 |
| CN | 113391675 A | 9/2021 |
| WO | 2016175055 A1 | 11/2016 |

* cited by examiner

DEVICE OPERATING METHOD, SYSTEM, AND DEVICE

The present disclosure claims the priority of the Chinese Patent Application No. 202110741518.0, entitled "WRIST-WORN DEVICE, METHOD FOR PREVENTING FALSE TRIGGERING OF DEVICE AND STORAGE MEDIUM", and filed in China Patent Office on Jun. 30, 2021, the entire disclosure of which are incorporated herein by reference.

TECHNICAL FIELD

The present disclosure relates to the field of intelligent wearable devices, and particularly to a wrist-worn device, a method for preventing false triggering of a device, and a storage medium.

DESCRIPTION OF RELATED ART

As intelligent wearable technologies develop, wrist-worn devices such as smart watches and smart bracelets have been widely used. Intelligent wrist-worn devices are gradually developing toward replacing mobile phones. The wrist-worn devices have many functions such as displaying time, navigation, calibration, heart rate monitoring, interaction, compass, pedometer and communication.

The wrist-worn devices are usually equipped with touch structures such as buttons, crowns and rotating shafts. A user may interact with a wearable device by pressing or rotating the touch structures. The rotating shaft is used as a shortcut to display touch. During hand movements of the user wearing the wrist-worn device, a back of a hand may touch the rotating shaft as a false triggering, which is easy to cause misoperation.

In view of the above, to identify whether the touch on rotating shaft is false triggering and improve the touch sensing accuracy of the wrist-worn device is a technical problem to be solved.

SUMMARY

An object of the present disclosure is to provide a wrist-worn device, a method for preventing false triggering of a device, and a storage medium, which can identify whether the touch on rotating shaft is false triggering and improve the touch sensing accuracy of the wrist-worn device.

In order to solve the above technical problem, the present disclosure provides a wrist-worn device, including a micro control unit, a distance sensor and a rotating shaft arranged on a side surface of the wrist-worn device, wherein an outer circumferential surface of the rotating shaft is provided with a plurality of protrusions, and the rotating shaft is parallel to the side surface of the wrist-worn device or parallel to a tangent plane of the side surface of the wrist-worn device, wherein the distance sensor is configured to collect distance data and send the distance data to the micro control unit, and the distance data includes a distance between the distance sensor and the rotating shaft; and the micro control unit is configured to obtain distance changing information on a distance between the distance sensor and the rotating shaft during a preset time according to the distance data, and determine a rotation angle of the rotating shaft according to the distance changing information on the distance, wherein the micro control unit is also configured to determine whether the rotation angle is greater than a preset value, if the rotation angle is greater than the preset value, responds to an event that the rotating shaft is triggered; and if the rotation angle is less than or equal to the preset value, determines that the touch on rotating shaft is false triggering, and no response to the event that the rotating shaft is triggered.

Optionally, the protrusions are gear teeth arranged at equal intervals along a rotation direction of the rotating shaft.

Optionally, all the gear teeth have the same shape and size.

Optionally, the distance sensor is an infrared distance sensor, and an infrared light emitting direction of the infrared distance sensor is perpendicular to and intersects with a central axis of the rotating shaft.

Optionally, the distance sensor is a millimeter-wave radar sensor, and a millimeter-wave emitting direction of the millimeter-wave radar sensor is perpendicular to and intersects with a central axis of the rotating shaft.

Optionally, the distance sensor is arranged on a main board of the wrist-worn device.

The present disclosure further provides a method for preventing false triggering of a device, configured to be applied to a wrist-worn device, wherein a side surface of the wrist-worn device is provided with a rotating shaft, an outer circumferential surface of the rotating shaft is provided with a plurality of protrusions, and the rotating shaft is parallel to the side surface of the wrist-worn device or parallel to a tangent plane of the side surface of the wrist-worn device, the method for preventing the false triggering of a device includes: receiving distance data collected by a distance sensor, wherein the distance data includes a distance between the distance sensor and the rotating shaft; obtaining distance changing information on a distance between the distance sensor and the rotating shaft during a preset time according to the distance data, and determining a rotation angle of the rotating shaft according to the distance changing information on the distance; determining whether the rotation angle is greater than a preset value. If the rotation angle is greater than the preset value, responds to an event that the rotating shaft is triggered, and if the rotation angle is less than or equal to the preset value, it is determined that the touch on rotating shaft is false triggering, and no response to the event that the rotating shaft is triggered.

Optionally, the method for preventing the false triggering of the device further includes, after receiving the distance data collected by the distance sensor: determining whether distance data collected in a current period is different from that in the previous period. If the distance data collected in the current period is different from that in the previous period, perform the step of obtaining the distance changing information on the distance between the distance sensor and the rotating shaft during the preset time, and determine the rotation angle of the rotating shaft according to the distance changing information on the distance.

Optionally, when the protrusions are gear teeth arranged at equal intervals along a rotation direction of the rotating shaft and all the gear teeth have the same shape and size, obtaining the distance changing information on the distance between the distance sensor and the rotating shaft during the preset time, and determining the rotation angle of the rotating shaft according to the distance changing information on the distance includes: obtaining the distance changing information on the distance between the distance sensor and the rotating shaft during the preset time, wherein the distance changing information on the distance includes a number of times that the distance between the distance sensor and the rotating shaft reaches a maximum value and a minimum value, respectively; and determining a number of the gear teeth by which the rotating shaft has rotated according to the distance changing information on the distance, and determining the rotation angle of the rotating shaft according to the number of the gear teeth by which the rotating shaft has rotated.

The present disclosure further provides a storage medium, on which a computer program is stored, when the computer program is executed, steps of the method for preventing the false triggering of the device are implemented.

The present disclosure provides a wrist-worn device, including a micro control unit, a distance sensor and a rotating shaft arranged on a side surface of the wrist-worn device, wherein an outer circumferential surface of the rotating shaft is provided with a plurality of protrusions, and the rotating shaft is parallel to the side surface of the wrist-worn device or parallel to a tangent plane of the side surface of the wrist-worn device, wherein the distance sensor is configured to collect distance data and send the distance data to the micro control unit, and the distance data includes a distance between the distance sensor and the rotating shaft, wherein the micro control unit is configured to obtain distance changing information on the distance between the distance sensor and the rotating shaft during a preset time according to the distance data, and determine a rotation angle of the rotating shaft according to the distance changing information on the distance, and wherein the micro control unit is also configured to determine whether the rotation angle is greater than a preset value. If the rotation angle is greater than the preset value, respond to an event that the rotating shaft is triggered, and if the rotation angle is less than or equal to the preset value, it is determined that the touch on rotating shaft is false triggering, and no response to the event that the rotating shaft is triggered.

The wrist-worn device provided by the present disclosure includes the micro control unit, the distance sensor and the rotating shaft, wherein the distance sensor is used to collect the distance between itself and the rotating shaft; since a plurality of protrusions are arranged on the outer circumferential surface of the rotating shaft, the distance data collected by the distance sensor will change when the rotating shaft is rotated by a user. The micro control unit receives the distance data transmitted by the distance sensor, and then determines the distance changing information on the distance between the distance sensor and the rotating shaft during the preset time. In case where the touch of hand on rotating shaft is false triggering, a rotating angle of the rotating shaft is relatively small. Based on this feature, the present disclosure determines the rotation angle of the rotating shaft according to the distance changing information on the distance, and determines whether the rotation angle is greater than the preset value. In case where the rotation angle is less than or equal to the preset value, it is determined that the touch on rotating shaft is false triggering, and no response to the event that the rotating shaft is triggered. Embodiments of the present disclosure can identify whether the touch on rotating shaft is false triggering, and improve the touch sensing accuracy of the wrist-worn device. Meanwhile, the present disclosure further discloses a method for preventing false triggering of a device and a storage medium, which have the above beneficial effects, and will not be repeated here.

BRIEF DESCRIPTION OF DRAWINGS

In order to explain the embodiment of the present disclosure or the technical solution of the related art more clearly, the following will briefly introduce the drawings necessary in the description of the embodiments or the prior art. Obviously, the drawings in the following description are only a part of the drawings of the present disclosure. For those ordinary skilled in the art, other drawings may be obtained based on the existing drawings without any creative effort.

DETAILED DESCRIPTIONS

In order to make the objects, technical solutions and advantages of the embodiments of the present disclosure clearer, the technical solutions in the embodiments of the present disclosure will be described clearly and completely below in conjunction with the accompanying drawings in the embodiments of the present disclosure. Obviously, the embodiments as described below are merely part of, rather than all, the embodiments of the present disclosure. Based on the embodiments of the present disclosure, any other embodiment obtained by a person of ordinary skill in the art without paying any creative effort shall fall within the protection scope of the present disclosure.

Figure 1:
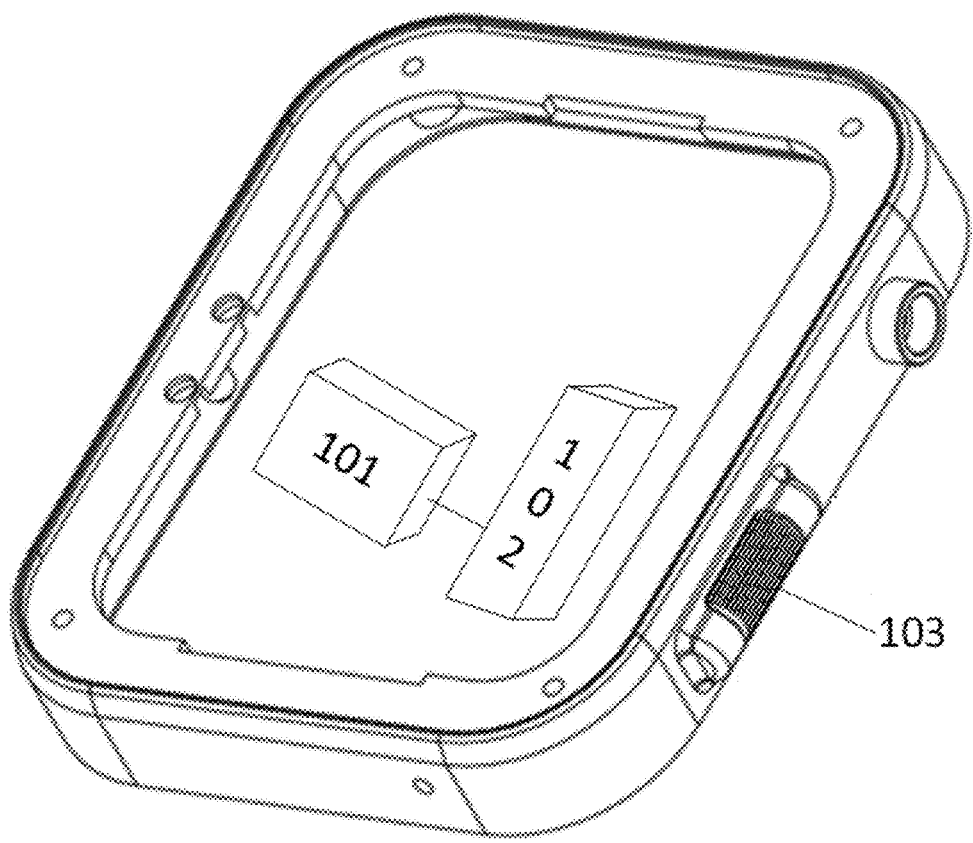
FIG. 1 is a schematic structural diagram of a wrist-worn device according to an embodiment of the present disclosure.
Figure 2:
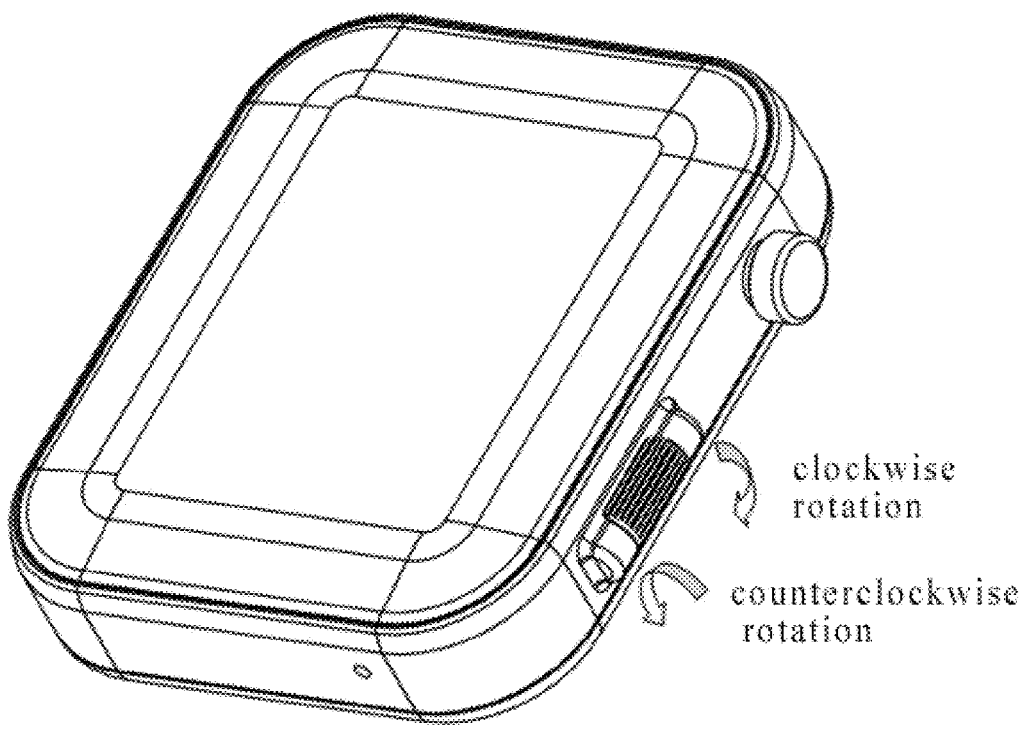
FIG. 2 is a schematic diagram of an appearance of a wrist-worn device according to an embodiment of the present disclosure.

Next, referring to FIG. 1 and FIG. 2, FIG. 1 is a schematic structural diagram of a wrist-worn device according to an embodiment of the present disclosure, and FIG. 2 is a schematic diagram of an appearance of a wrist-worn device according to an embodiment of the present disclosure. The wrist-worn device may include a micro control unit 101, a distance sensor 102 and a rotating shaft 103 arranged on a side surface of the wrist-worn device, wherein an outer circumferential surface of the rotating shaft 103 is provided with a plurality of protrusions, and the rotating shaft is parallel to the side surface of the wrist-worn device or parallel to a tangent plane of the side surface of the wrist-worn device. Specifically, when a housing of a wearable device is generally rectangular, the rotating shaft may be parallel to a side wall of the housing where a roller is arranged. For example, the rotating shaft may be parallel to a long side of the side wall of the housing or parallel to a short side of the side wall of the housing. When the housing of the wearable device is generally circular, the rotating shaft is parallel to a tangent plane of the side wall of the housing where the rotating shaft is arranged.

Further, both the micro control unit 101 and the distance sensor 102 may be arranged on a main board of the wrist-worn device, and the distance sensor 102 is arranged opposite to the rotating shaft 103. The wrist-worn device may be a watch or a bracelet.

Figure 3:
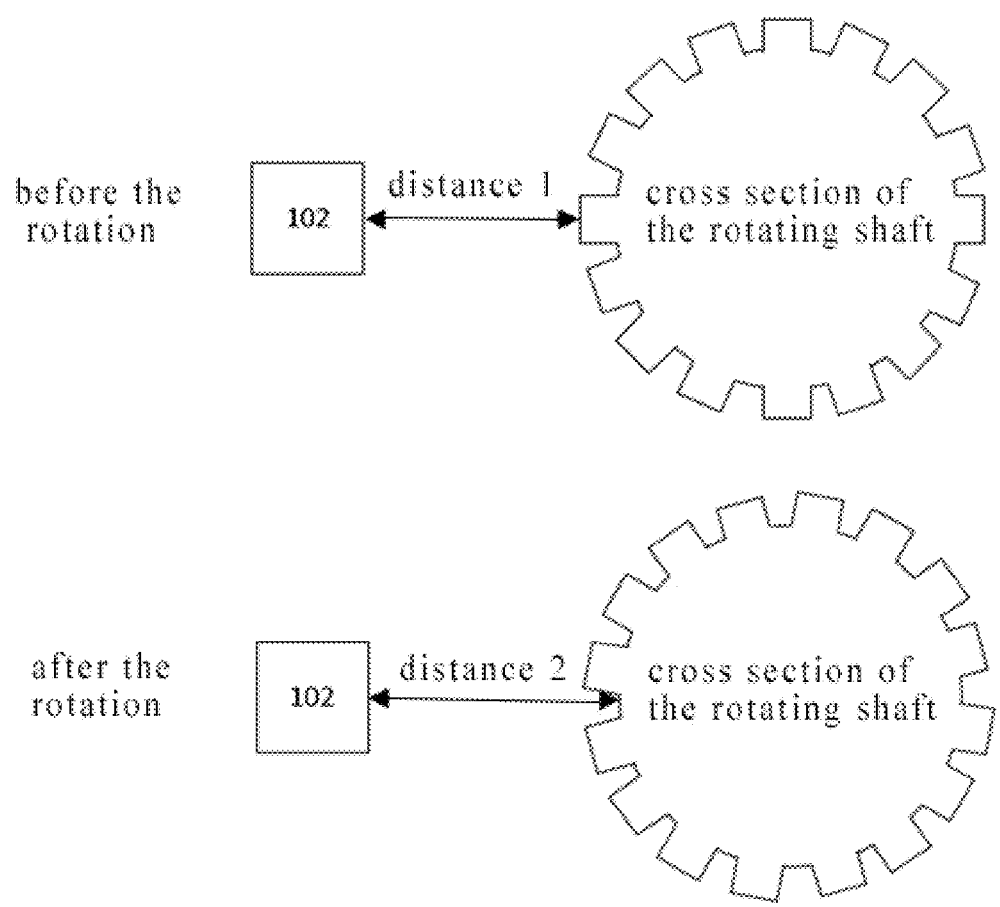
FIG. 3 is a schematic diagram of a principle of collecting distance data by a first distance sensor according to an embodiment of the present disclosure.

Referring to FIG. 3, FIG. 3 is a schematic diagram of a principle of collecting distance data by a first distance sensor according to an embodiment of the present disclosure. The above distance sensor 102 is used to detect a distance between itself and the rotating shaft 103; that is, the distance sensor 103 detects the distance between itself and a specific position of the rotating shaft. As shown in FIG. 3, since there are a plurality of protrusions on the outer circumferential surface of the rotating shaft, a distance 1 and a distance 2 detected by the distance sensor 102 are not equal before and after the rotating shaft is rotated. That is, the distance data changes as the rotating shaft rotates. In the present embodiment, the rotating shaft 103 may rotate counterclockwise or clockwise.

Further, the distance sensor 102 is used to collect distance data and send the distance data to the micro control unit 101. The distance data includes a distance between the distance sensor and the rotating shaft detected in each measuring period.

The micro control unit 101 may obtain distance changing information on a distance between the distance sensor and the rotating shaft during a preset time according to the distance data, and then determine a rotation angle of the rotating shaft according to the distance changing information on the distance. The distance changing information on the distance refers to a variation of the distance between the distance sensor and the rotating shaft adjacent two measuring periods, and the rotation angle indicates the angle by which the rotating shaft has rotated during this time.

After obtaining the rotation angle of the rotating shaft during the preset time, it may be determined whether the rotation angle is greater than a preset value. If the rotation angle is greater than the preset value, it is determined that there is no false triggering, and may respond to an event that the rotating shaft is triggered. For example, screen wake-up, volume adjustment, telephone answering, and the like. If the rotation angle is less than or equal to the preset value, it is determined that the touch on rotating shaft is false triggering, and no response to the event that the rotating shaft is triggered.

The wrist-worn device provided by the present disclosure includes the micro control unit, the distance sensor and the rotating shaft, wherein the distance sensor is used to collect the distance between itself and the rotating shaft. Since a plurality of protrusions are arranged on the outer circumferential surface of the rotating shaft, the distance data collected by the distance sensor will change when the rotating shaft is rotated by a user. The micro control unit receives the distance data transmitted by the distance sensor, and then determines the distance changing information on the distance between the distance sensor and the rotating shaft during the preset time. In case where the touch of hand on rotating shaft is false triggering, a rotating angle of the rotating shaft is relatively small. Based on these configurations, the present disclosure determines the rotation angle of the rotating shaft according to the distance changing information on the distance, and determines whether the rotation angle is greater than the preset value. In case where the rotation angle is less than or equal to the preset value, it is determined that the touch on rotating shaft is false triggering, and no response to the event that the rotating shaft is triggered. The embodiments of the present disclosure may identify whether the touch on rotating shaft is false triggering, and improve the touch sensing accuracy of the wrist-worn device.

The distance sensor 103 mentioned in the above embodiment may be an infrared distance sensor, a millimeter-wave radar sensor, an ultrasonic sensor, and the like. When the distance sensor 103 is an infrared distance sensor, an infrared light emitting direction of the infrared distance sensor is perpendicular to and intersects with a central axis of the rotating shaft. When the distance sensor 103 is a millimeter-wave radar sensor, a millimeter-wave emitting direction of the millimeter-wave radar sensor is perpendicular to and intersects with a central axis of the rotating shaft.

Figure 4:
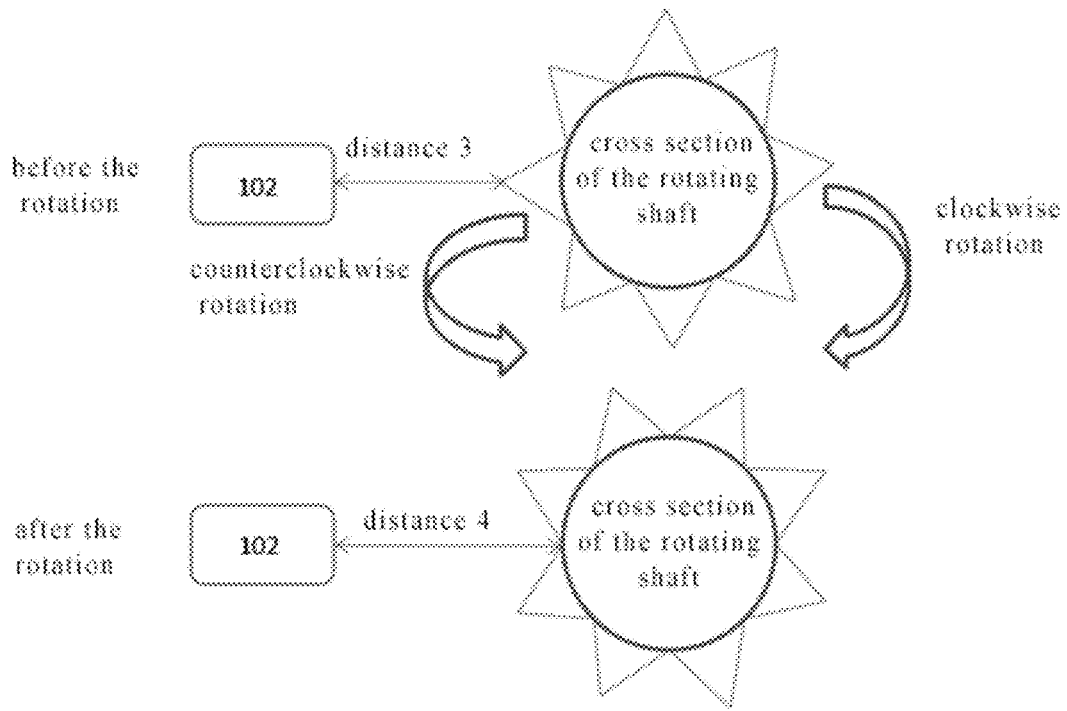
FIG. 4 is a schematic diagram of a principle of collecting distance data by a second distance sensor according to an embodiment of the present disclosure.

As a further introduction to the embodiment corresponding to FIG. 1, the above-mentioned protrusions may be gear teeth arranged at equal intervals along a rotation direction of the rotating shaft, and further, all the gear teeth on the rotating shaft have the same shape and size. Referring to FIG. 4, FIG. 4 is a schematic diagram of a principle of collecting distance data by a second distance sensor according to an embodiment of the present disclosure. FIG. 4 shows a ranging process where the protrusions are triangular gear teeth, and in this case, a distance 3 and a distance 4 detected by the distance sensor 102 are not equal before and after the rotating shaft has been rotated, i.e., the distance data changes as the rotating shaft rotates.

A method for preventing false triggering of a smart watch is taken for description through an example in an actual application in the following. The smart watch includes a rotating shaft with triangular gear teeth as protrusions and an infrared distance sensor IR sensor.

The above-mentioned rotating shaft is provided with equidistant gear teeth, and an infrared distance sensor is placed at a position close to the rotating shaft on the main board. As shown in FIG. 4, when the rotating shaft rotates, a distance between the gear teeth with the infrared distance sensor changes, and the distance between the gear teeth with the infrared distance sensor changes once by each gear tooth that the rotating shaft have rotated. When the rotating shaft rotates due to the bending of the palm, the infrared distance sensor emits infrared light of 850 nm, which is incident onto the rotating gear teeth and then reflected back to the infrared distance sensor. At this time, the distance between the infrared distance sensor and the rotating shaft may be calculated. The function of switching display screen may be realized by rotating the rotating shaft.

Figure 5:
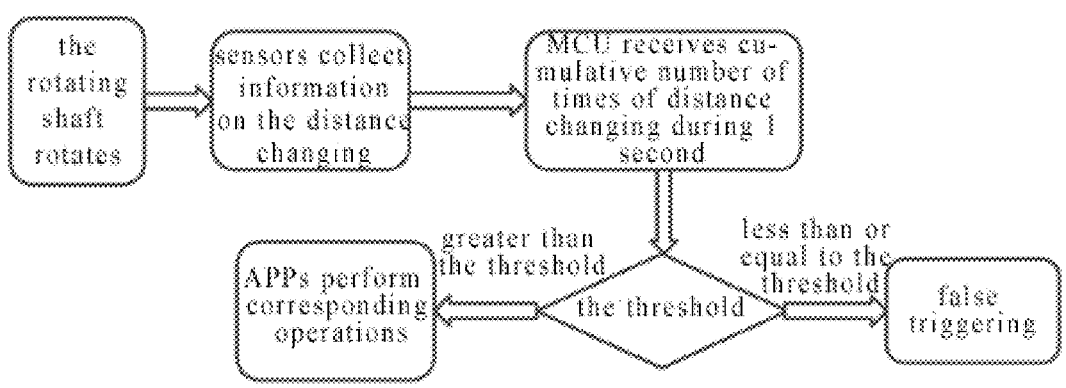
FIG. 5 is a schematic diagram of a principle of preventing false triggering of a smart watch according to an embodiment of the present disclosure.

Since the user often touches the rotating shaft with the back of the hand when wearing the smart watch, which leads to false triggering, in this case, the rotation angle of the rotating shaft is relatively small, and the present embodiment may set an appropriate threshold (preset value) by simulating respective usage scenarios. Referring to FIG. 5, FIG. 5 is a schematic diagram of a principle of preventing false triggering of a smart watch according to an embodiment of the present disclosure. The infrared distance sensor (IR sensor) feeds back the detected changes in the distance between an infrared emitting port of the infrared distance sensor with the gear teeth to the micro control unit (MCU). After changes are detected, the micro control unit calculates the cumulative number of times of distance changing during 1 second (1 sec), and compares the number of times of distance changing with a preset threshold. If the number of times of distance changing is greater than the preset threshold, the rotation is valid by default, and application programs (APPs) in the watch may perform corresponding operations. If the number of times of distance changing is less than or equal to the preset threshold, it is determined that the operation is invalid (i.e., false triggering). Through the above methods, troubles caused by misoperation may be avoided in time, so that the user may do various sports with confidence.

Figure 6:
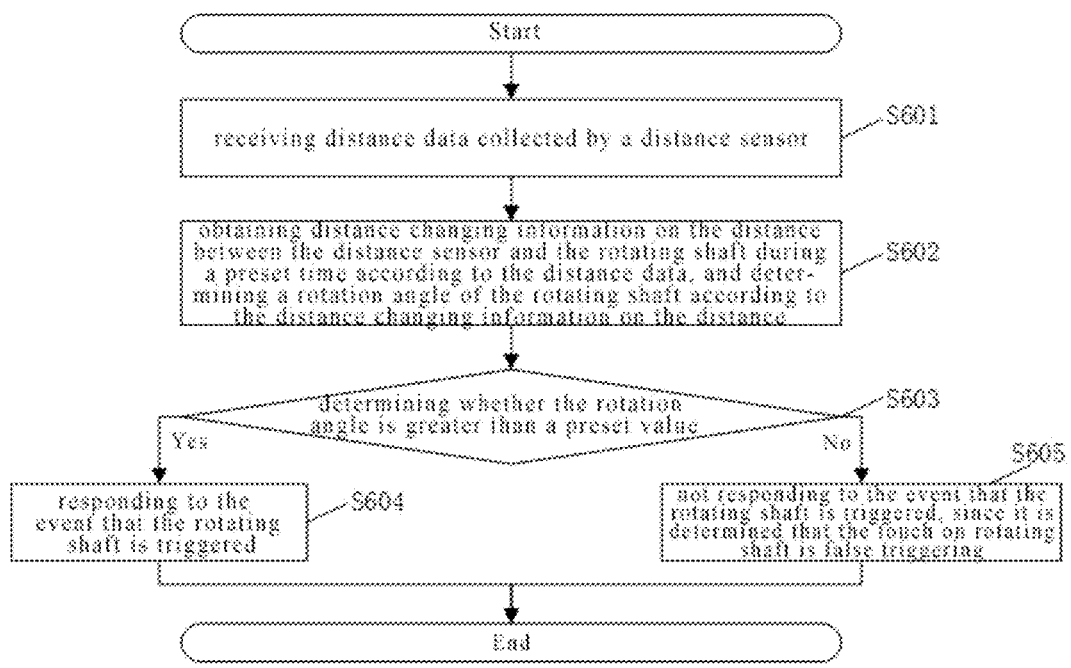
FIG. 6 is a flowchart of a method for preventing false triggering of a device according to an embodiment of the present disclosure.

Referring to FIG. 6, FIG. 6 is a flowchart of a method for preventing false triggering of a device according to an embodiment of the present disclosure. Embodiments of the method may be applied to any wrist-worn device described in the above embodiments. A side surface of the wrist-worn device is provided with a rotating shaft, an outer circumferential surface of the rotating shaft is provided with a plurality of protrusions, and the rotating shaft is parallel to the side surface of the wrist-worn device or parallel to a tangent plane of the side surface of the wrist-worn device. In addition, the method for preventing the false triggering of the device may include the following steps.

S601, receiving distance data collected by a distance sensor. Here, the distance data includes a distance between the distance sensor and the rotating shaft.

S602, obtaining distance changing information on the distance between the distance sensor and the rotating shaft during a preset time according to the distance data, and determining a rotation angle of the rotating shaft according to the distance changing information on the distance.

S603, determining whether the rotation angle is greater than a preset value, if the rotation angle is greater than the preset value, goes to step S604; and if the rotation angle is less than or equal to the preset value, goes to step S605.

S604, responding to the event that the rotating shaft is triggered.

S605, not responding to the event that the rotating shaft is triggered, since it is determined that the touch on rotating shaft is false triggering.

The wrist-worn device provided by the present disclosure includes the micro control unit, the distance sensor and the rotating shaft, wherein the distance sensor is used to collect the distance between itself and the rotating shaft; since a plurality of protrusions are arranged on the outer circumferential surface of the rotating shaft, the distance data collected by the distance sensor will change when the rotating shaft is rotated by a user. The micro control unit receives the distance data transmitted by the distance sensor, and then determines the distance changing information on the distance between the distance sensor and the rotating shaft during the preset time. In case where the touch of hand on rotating shaft is false triggering, a rotating angle of the rotating shaft is relatively small. Based on this feature, the present disclosure determines the rotation angle of the rotating shaft according to the distance changing information on the distance, and determines whether the rotation angle is greater than the preset value. In case where the rotation angle is less than or equal to the preset value, it is determined that the touch on rotating shaft is false triggering and no response to the event that the rotating shaft is triggered. Embodiments of the present disclosure may identify whether the touch on rotating shaft is false triggering, and improve the touch sensing accuracy of the wrist-worn device.

As a further introduction to the embodiment corresponding to FIG. 6, the method for preventing the false triggering of the device may further include the following steps, after receiving the distance data collected by the distance sensor, before determining the distance changing information on the distance: determining whether distance data collected in a current period is different from that in the previous period. If the distance data collected in the current period is different from that in the previous period, perform the step S602 of obtaining the distance changing information on the distance between the distance sensor and the rotating shaft during the preset time, and determine the rotation angle of the rotating shaft according to the distance changing information on the distance. Through the above method, the step of obtaining the distance changing information on the distance during the preset time may be avoided when the distance data collected in the current period and the distance data collected in the previous period are unchanged, thereby reducing the energy consumption of the device.

As a further introduction to the embodiment corresponding to FIG. 6, when the structure of the rotating shaft is shown in FIG. 4, the protrusions are gear teeth arranged at equal intervals along a rotation direction of the rotating shaft and all the gear teeth have the same shape and size, the rotation angle may be determined by the following methods: obtaining the distance changing information on the distance between the distance sensor and the rotating shaft during the preset time, wherein the distance changing information on the distance comprises a number of times that the distance between the distance sensor and the rotating shaft reaches a maximum value and a minimum value, respectively; and determining a number of the gear teeth by which the rotating shaft has rotated according to the distance changing information on the distance, and determining the rotation angle of the rotating shaft according to the number of the gear teeth by which the rotating shaft has rotated.

The above embodiments may effectively avoid misoperation caused by the false triggering, and provide a good guarantee for the operability of the rotating shaft, so that the user may exercise with confidence and improve the experience effect.

Since the embodiments of the method and the embodiments of the device correspond to each other, for the embodiments of the method, one may refer to the embodiments of the device. Details are not described herein again.

The present disclosure further provides a storage medium, on which a computer program is stored, when the computer program is executed, steps provided by the above embodiments may be implemented. The storage medium may include various media that may store program codes such as a U disk, a mobile hard disk, a read-only memory (ROM), a random access memory (RAM), a magnetic disk, or an optical disk.

The embodiments in the specification are described in a progressive way, each of which emphasizes differences from others, and for the same or similar parts among the embodiments, reference may be made to each other. Since the device disclosed in the embodiments corresponds to the method disclosed herein, the description of the device is relatively simple, and for relevant matters, reference may be made to the description of the method embodiments. It should be pointed out that, for those skilled in the art, various improvements and modifications may be made to the present disclosure without departing from the principle of the present disclosure, and such improvements and modifications fall within the protection scope of the claims of the present disclosure.

It should also be noted that in the specification, relational terms such as "first" and "second" are merely for distinguishing one entity or operation from another entity or operation, and do not necessarily require or imply that there is an actual relationship or order between these entities or operations. Moreover, terms of "comprise", "include" or any other variants are intended to be non-exclusive, so that a process, a method, an article or a device including a series of elements includes not only these elements but also includes other elements that are not explicitly listed, or also includes elements inherent in the process, the method, the article or the device. Unless otherwise explicitly limited, the statement "comprising a . . . " does not exclude the existence of other identical elements in the process, the method, the article or the device that includes the element.

What is claimed is:

1. A wrist-worn device, comprising a micro control unit, a distance sensor and a rotating shaft arranged on a side surface of the wrist-worn device,
   wherein an outer circumferential surface of the rotating shaft is provided with a plurality of protrusions, and the rotating shaft is parallel to the side surface of the wrist-worn device or parallel to a tangent plane of the side surface of the wrist-worn device,
   wherein the distance sensor is configured to collect distance data and send the distance data to the micro control unit, and the distance data comprises a distance between the distance sensor and the rotating shaft,
   wherein the micro control unit is configured to obtain distance changing information on a distance between the distance sensor and the rotating shaft during a preset time according to the distance data, and determine a rotation angle of the rotating shaft according to the distance changing information on the distance, and
   wherein the micro control unit is also configured to determine whether the rotation angle is greater than a preset value, if the rotation angle is greater than the preset value, responds to an event that the rotating shaft is triggered, and if the rotation angle is less than or equal to the preset value, it is determined that the touch on rotating shaft is false triggering, and no response to the event that the rotating shaft is triggered.

2. The wrist-worn device of claim 1, wherein the protrusions are gear teeth arranged at equal intervals along a rotation direction of the rotating shaft.

3. The wrist-worn device of claim 2, wherein all the gear teeth have the same shape and size.

4. The wrist-worn device of claim 1, wherein the distance sensor is an infrared distance sensor, and an infrared light emitting direction of the infrared distance sensor is perpendicular to and intersects with a central axis of the rotating shaft.

5. The wrist-worn device of claim 1, wherein the distance sensor is a millimeter-wave radar sensor, and a millimeter-wave emitting direction of the millimeter-wave radar sensor is perpendicular to and intersects with a central axis of the rotating shaft.

6. The wrist-worn device of claim 1, wherein the distance sensor is arranged on a main board of the wrist-worn device.

7. A method for preventing false triggering of a device, configured to be applied to a wrist-worn device, wherein a side surface of the wrist-worn device is provided with a rotating shaft, an outer circumferential surface of the rotating shaft is provided with a plurality of protrusions, and the rotating shaft is parallel to the side surface of the wrist-worn device or parallel to a tangent plane of the side surface of the wrist-worn device, wherein the method for preventing the false triggering of the device comprises:
   receiving distance data collected by a distance sensor, wherein the distance data comprises a distance between the distance sensor and the rotating shaft;
   obtaining distance changing information on a distance between the distance sensor and the rotating shaft during a preset time according to the distance data, and determining a rotation angle of the rotating shaft according to the distance changing information on the distance;
   determining whether the rotation angle is greater than a preset value;
   if the rotation angle is greater than the preset value, responding to an event that the rotating shaft is triggered; and
   if the rotation angle is less than or equal to the preset value, it is determined that the touch on rotating shaft is false triggering, not responding to the event that the rotating shaft is triggered.

8. The method for preventing the false triggering of the device of claim 7, further comprising, after receiving the distance data collected by the distance sensor:
   determining whether distance data collected in a current period is different from that in the previous period; and
   if the distance data collected in the current period is different from that in the previous period, obtaining the distance changing information on the distance between the distance sensor and the rotating shaft during the preset time, and determining the rotation angle of the rotating shaft according to the distance changing information on the distance.

9. The method for preventing the false triggering of the device of claim 7, wherein when the protrusions are gear teeth arranged at equal intervals along a rotation direction of the rotating shaft and all the gear teeth have the same shape and size, obtaining the distance changing information on the distance between the distance sensor and the rotating shaft during the preset time, and determining the rotation angle of the rotating shaft according to the distance changing information on the distance comprises:
   obtaining the distance changing information on the distance between the distance sensor and the rotating shaft during the preset time, wherein the distance changing information on the distance comprises a number of times that the distance between the distance sensor and the rotating shaft reaches a maximum value and a minimum value, respectively; and
   determining a number of the gear teeth by which the rotating shaft has rotated according to the distance changing information on the distance, and determining the rotation angle of the rotating shaft according to the number of the gear teeth by which the rotating shaft has rotated.

10. A non-transitory storage medium, wherein a computer-executable program is stored on the non-transitory storage medium, and when the computer-executable program is loaded and executed by a processor, steps of the method for preventing the false triggering of the device of claim 7 are implemented.

* * * * *

UNITED STATES PATENT AND TRADEMARK OFFICE
CERTIFICATE OF CORRECTION

PATENT NO. : 12,326,987 B2  
APPLICATION NO. : 18/559903  
DATED : June 10, 2025  
INVENTOR(S) : Li Tian Page 1 of 1

It is certified that error appears in the above-identified patent and that said Letters Patent is hereby corrected as shown below:

On the Title Page

In Item (54), and in the Specification, Column 1, Lines 1-2, delete "DEVICE OPERATING METHOD, SYSTEM, AND DEVICE" and insert -- WRIST-WORN DEVICE, METHOD FOR PREVENTING FALSE TRIGGERING OF DEVICE AND STORAGE MEDIUM -- therefor.

Signed and Sealed this  
Ninth Day of September, 2025

Coke Morgan Stewart  
*Acting Director of the United States Patent and Trademark Office*